United States Patent
Wang et al.

(10) Patent No.: US 6,717,931 B2
(45) Date of Patent: Apr. 6, 2004

(54) ADAPTIVE SPREADING FACTOR BASED ON POWER CONTROL

(75) Inventors: Yan Wang, Placentia, CA (US); Roy Thomas Derryberry, Plano, TX (US)

(73) Assignee: Nokia Corporation, Espoo (FI)

( * ) Notice: Subject to any disclaimer, the term of this patent is extended or adjusted under 35 U.S.C. 154(b) by 78 days.

(21) Appl. No.: 10/040,891

(22) Filed: Jan. 2, 2002

(65) Prior Publication Data

US 2003/0123382 A1 Jul. 3, 2003

(51) Int. Cl.[7] ............................................... H04B 7/216
(52) U.S. Cl. ...................................... 370/335; 370/465
(58) Field of Search ................................. 370/335, 342, 370/352, 465; 455/522, 69

(56) References Cited

U.S. PATENT DOCUMENTS

| | | | | |
|---|---|---|---|---|
| 6,046,991 A | * | 4/2000 | Abramson | 370/335 |
| 6,249,682 B1 | * | 6/2001 | Kubo et al. | 455/522 |
| 6,337,973 B1 | * | 1/2002 | Agin et al. | 370/335 |
| 6,414,948 B1 | * | 7/2002 | Sato | 370/335 |
| 6,501,744 B1 | * | 12/2002 | Alexandre | 370/335 |
| 6,553,018 B1 | * | 4/2003 | Ichihara | 370/335 |

OTHER PUBLICATIONS

I et al., Variable Spreading Gain CDMA with Adaptive Control for Integrated Traffic in Wireless Networks, 1995, IEEE, pp. 794–798.*
H. Holma et al, Ed., "WCDMA for UMTS/Radio Access for Third Generation Mobile Communications", John Wilen & Sons, Ltd, , West Sussex, England, 2001, pp. 33–36.
J. Korhonen, "Introduction to 3G Mobile Communications", Artech House, Boston, 2001, pp. 30–35.

* cited by examiner

Primary Examiner—Chi Pham
Assistant Examiner—Keith M. George

(57) ABSTRACT

Near-far effect fading is counteracted by changing the spreading factor used for uplink channel spreading. The determination that a radio uplink channel power fade exists can be made in either the radio access network or the mobile station.

44 Claims, 7 Drawing Sheets too weak. This is called the near-far effect and is solved by uplink power control. The faraway mobile station transmits with more power than the mobile station close to the base station so they are received with the same signal power.

ADAPTIVE SPREADING FACTOR BASED ON POWER CONTROL

BACKGROUND OF THE INVENTION

1. Technical Field

The present invention relates to channel fading in a mobile telecommunications network and, more particularly, efficient power control between a transmitter and a receiver of a radio signal undergoing fading.

2. Discussion of Related Art

A base station or radio network controller will normally be in radio communication with several mobile stations within its coverage area. It is desirable for uplink signals from the mobile stations to the base station to be received with the same signal power. Because the mobile stations are at different distances from the base station they cannot transmit using fixed power levels since mobile stations close to the base station would have too strong a signal and mobile stations far away would be too weak. This is called the near-far effect and is solved by uplink power control. The faraway mobile station transmits with more power than the mobile station close to the base station so they are received with the same signal power.

Usually, there are two types of power control used, i.e., open-loop and closed-loop. The open-loop method requires the mobile station to measure channel interference and adjust its own transmission power according to the measured interference without any interaction with the base station. This approach has certain problems, particularly where the uplink and the downlink are transmitted on different frequencies and fading on the different frequency carriers are not particularly well correlated.

Fading exists because a single line-of-sight radio path may not exist from the mobile station to the base station. Consequently, the base station may observe the superposition of many copies of the same signal from the mobile station, each one with a different delay. These delayed signals are due to the reflection from objects such as trees, cars, buildings, etc. If the mobile station is moving, the copies of the signal can add constructively or destructively and the signal received at the base station appears to fluctuate, or fade wildly.

In an uplink closed-loop power control approach, the quality of the uplink from the mobile station to the base station is measured in the base station. Power control commands formulated in the base station are adjusted accordingly and sent back to the mobile station so that it adjusts its transmission power correspondingly. This gives faster and better results than the above-mentioned open-loop approach, but it still cannot react to rapid fading as well as might be desired. A known way to address this problem is to make the closed-loop measurements and reporting very fast. However, the transmit power control (TPC) commands that are sent e.g., every time slot (667 microseconds) are still only commanding a small increment of change in power while the fading may be more extreme. In that case it takes a long time for the power control commands to elicit the desired response and by that time the fading may be changing in the opposite direction.

DISCLOSURE OF INVENTION

An object of the present invention is to provide an enhanced power control between a radio transmitter and receiver to counteract fast signal fading variations in the channel.

According to a first aspect of the present invention, a method comprises the steps of determining that a radio uplink channel power fluctuation exists, and changing a spreading factor used for uplink channel spreading to counteract said power fluctuation.

Further according to the first aspect of the invention, the change in spreading factor is an increase due to the channel power fluctuation determined as comprising a decreasing power fluctuation.

Further still according to the first aspect of the invention, the change in spreading factor is a decrease due to the channel power fluctuation determined as comprising an increasing power fluctuation.

Still further according to the first aspect of the invention, the step of determining is carried out in a radio network and wherein the method further comprises the step of sending a spreading factor control signal from the network to a mobile station followed by the mobile station carrying out the step of changing the spreading factor.

Yet still further according to the first aspect of the invention, the step of changing is carried out by the mobile station only if the mobile station independently determines that the step of changing the spreading factor is permissible.

Further in accord with the first aspect of the invention, the method farther comprises the step of sending a transmit power control (TPC) signal from the network to the mobile station and wherein the step of determining comprises the step of counting instances of the TPC signal at the network and carrying out the step of determining by determining at the network if a count of the instances exceeds a selected number.

Yet further in accord with the first aspect of the invention, the selected number is adaptable.

Further still in accord with the first aspect of the invention, the selected number is adaptable within a window comprising a selected plurality of TPC signal instances.

Further according to the first aspect of the invention, the step of determining further comprises the step of determining a frame or block error rate of the radio uplink channel and wherein the step of changing the spreading factor is carried out only if the frame or block error rate meets a selected criterion.

Further still according to the first aspect of the invention, the step of determining comprises the step of detecting in a radio network the radio uplink channel power fluctuation in the radio uplink channel from a mobile station to the network, and wherein the method further comprises the step of transmitting a transmit power control (TPC) signal from the network to the mobile station commanding a change in transmit power to counteract power fluctuation.

Yet further still according to the first aspect of the invention, the step of determining comprises the step of counting instances of said TPC signal at the network or at the mobile station and carrying out the step of determining by determining at the network or at the mobile station if a count of the instances exceeds a selected number followed by the mobile station carrying out the step of changing the transmit power in response to a command signal from the network or in response to the count at the mobile station exceeding the selected number.

Yet still further according to the first aspect of the invention, the step of changing is carried out by the mobile station only if the mobile station independently determines that the step of changing the spreading factor is permissible.

Yet further still according to the first aspect of the invention, step of counting, at the mobile station, instances of the TPC signal and wherein the step of determining comprises the step of determining at the mobile station if a count of the instances exceeds a selected number.

Further in accord with the first aspect of the invention, the step of determining is carried out in a mobile station.

Yet further in accord with the first aspect of the invention, the step of counting, at the mobile station, instances of a transmit power control (TPC) signal received from a radio network and the step of determining comprises the step of determining at the mobile station if a count of the instances exceeds a selected number.

According to a second aspect of the invention, an apparatus comprises means for determining that a radio uplink channel power fluctuation exists, and means for changing a spreading factor used for uplink channel spreading to counteract said power fluctuation.

Further according to the second aspect of the invention, the change in spreading factor is an increase due to said channel power fluctuation determined as comprising a decreasing power fluctuation.

Still further according to the second aspect of the invention, the change in spreading factor is a decrease due to the channel power fluctuation determined as comprising an increasing power fluctuation.

Further still according to the second aspect of the invention, the means for determining is located in a radio network and wherein said apparatus further comprises means for sending a spreading factor control signal from the network to a mobile station to means for deciding a change in spreading factor.

Yet further according to the second aspect of the invention, the change is carried out by the mobile station only if the means for deciding independently determines that the change in the spreading factor is permissible.

Yet still further according to the second aspect of the invention, the apparatus further means for sending a transmit power control (TPC) signal from the network to the mobile station and wherein the means for determining comprises means for counting instances of the TPC signal at the network and means for deciding at the network if a count of the instances exceeds a selected number.

Yet further still according to the second aspect of the invention, the selected number is adaptable.

Further in accord with the second aspect of the invention, the selected number is adaptable within a window comprising a selected plurality of TPC signal instances.

Further still in accord with the second aspect of the invention, the step of determining further comprises means for determining a frame or block error rate of the radio uplink channel and wherein the means for changing the spreading factor changes the spreading factor only if said frame or block error rate meets a selected criterion.

Yet still further in accord with the second aspect of the invention, the means for determining comprises means for detecting in a radio network the radio uplink channel power fluctuation in the radio uplink channel from a mobile station to the network, and the apparatus further comprises means for transmitting a transmit power control (TPC) signal from the network to the mobile station commanding a change in transmit power to counteract the power fluctuation.

Yet further still in accord with the second aspect of the invention, the means for determining comprises means for counting instances of the TPC signal at the network or at the mobile station and means for determining at the network or at the mobile station if a count of the instances exceeds a selected number followed by the mobile station changing the transmit power in response to a command signal from the network or in response to the count at the mobile station exceeding the selected number.

Further according to the second aspect of the invention, the means for determining further comprises means for determining a frame or block error rate of the radio uplink channel and wherein the means for changing the spreading factor changes the spreading factor only if the frame or block error rate meets a selected criterion.

Yet further according to the second aspect of the invention, the means for changing is carried out by the mobile station only if the mobile station independently determines that the changing the spreading factor is permissible.

Further still according to the second aspect of the invention, the means for counting, at the mobile station, instances of TPC signal and wherein the means for determining comprises means for determining at the mobile station if a count of the instances exceeds a selected number.

Still further according to the second aspect of the invention, the means for determining further comprises means for determining a frame or block error rate of the radio uplink channel and wherein the means for changing the spreading factor changes the spreading factor only if the frame or block error rate meets a selected criterion.

Yet further still according to the second aspect of the invention, the means for determining is located in a mobile station.

Yet still further according to the second aspect of the invention, the apparatus further comprises means for counting, at the mobile station, instances of a transmit power control (TPC) signal received from a radio network and the means for determining comprises means for determining at the mobile station if a count of the instances exceeds a selected number.

These and other objects, features and advantages of the present invention will become more apparent in light of the following detailed description of a best mode embodiment thereof, as illustrated in the accompanying drawing.

BEST MODE FOR CARRYING OUT THE INVENTION

The capacity of a conventional CDMA system is maximized if the power transmitted from each mobile station is controlled so that at the base station the same power level is received from each mobile station. The power control is used to combat the near-far effect and thereby minimize the effect of interference on system capacity. However, due to fast signal fading variations in the channel and the use of a fixed and rather small power control step, the transmit signal power is not able to track quickly changing uplink channel variations. For the uplink, if the base station receives the signal from the mobile station (MS) (called UE or user equipment in 3 GPP) at a low power level, the base station will send an "up" power control command on the downlink to the mobile station (user equipment). If the mobile station receives this command without error, it will "raise" its transmitted power by a small step. If the base station receives the MS signal at too high a level, the base station will send a "down" power control command. The mobile station will then reduce its transmitted power. Power control is described in general at pages 30–35 of "Introduction to 3G Mobile Communications" by Juha Korhonen, Artech House 2001. Power control is also described in Section 3.5 at pages 33–36 of "WCDMA for UMTS" by H. Holma and A. Toskala, Revised Edition, Wiley 2001. According to Section 6.6 of the last-mentioned reference, the fast closed loop power control procedure operates on the basis of one command per slot, resulting in a 1,500 Hertz command rate with a basic step size of 1 dB.

Figure 1A:
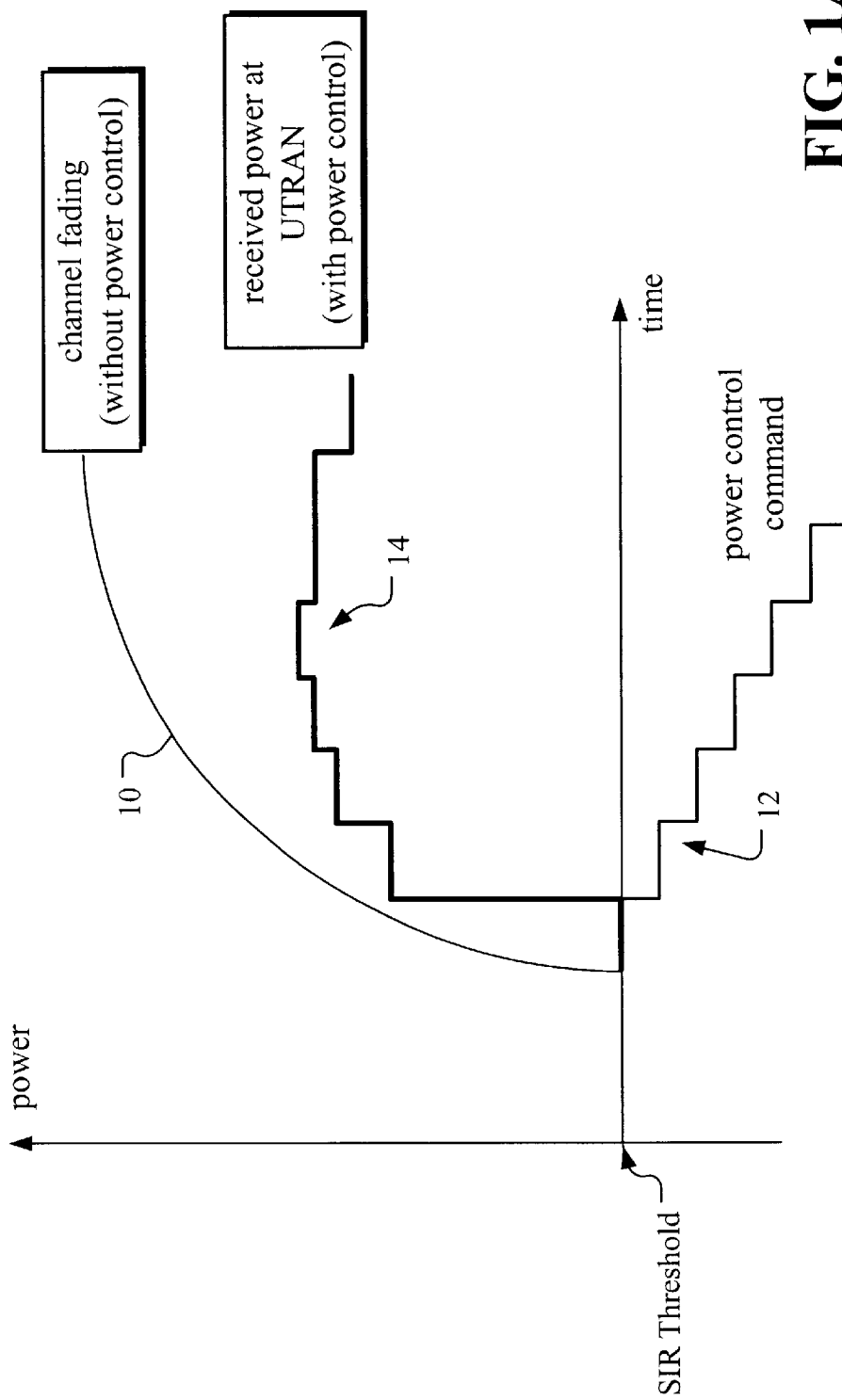
FIG. 1A shows a prior art fading phenomenon with rapidly-increasing power received at the base station counteracted by a series of transmit power commands from the base station to the mobile station to lower its transmitting power level in steps.

FIG. 1A shows a rapidly increasing channel fading phenomenon indicated by a reference numeral 10 wherein a base station is receiving an uplink channel from a mobile station (again, called user equipment or UE in 3G) or MS with a received channel power level increasing rapidly above a signal interference ratio (SIR) threshold with increasing time. This threshold may be a target SIR, be a threshold level above a SIR target level, or the like. In any event, the network, e.g., the base station, which may be part of a universal terrestrial radio access network (UTRAN) for third generation (3G) mobile telecommunications, will detect the increasing channel fading 10 and will initiate power control with instructions issued in steps corresponding to slots of a frame to gradually decrease its transmitted power. These power control commands are shown as a declining staircase signified by a reference numeral 12 in FIG. 1A. These power control commands cause the mobile station to incrementally decrease its transmitted power with the effect shown by the received signal power 14 at the base station with this power control effectively reducing the increasing channel fading but only very gradually.

Figure 1B:
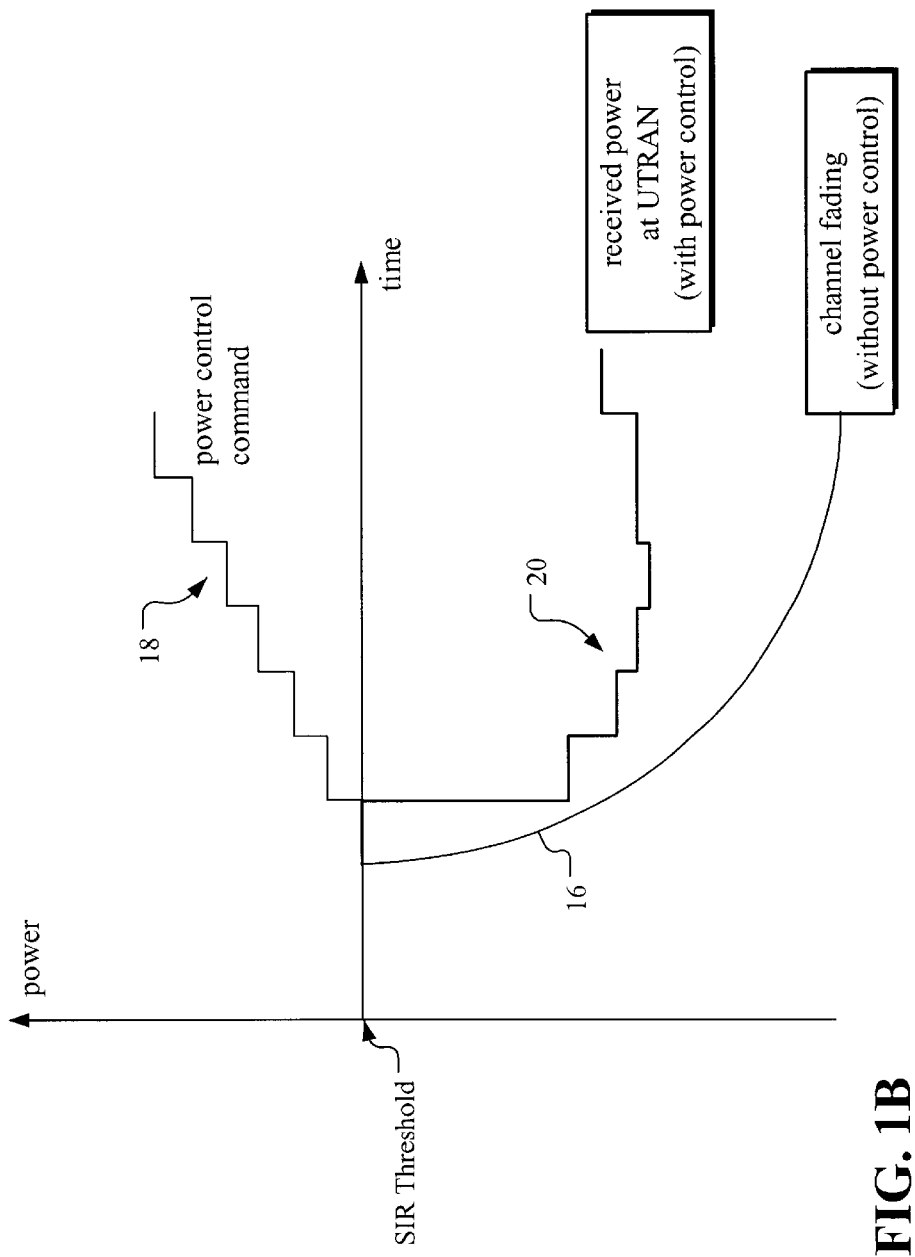
FIG. 1B is similar to FIG. 1A, except showing the mobile station power sensed by the base station falling rapidly and the base station responding by sending a series of increase power commands.

Likewise, as shown in FIG. 1B, if the channel fading is in the opposite direction as signified by a reference numeral 16, showing a given mobile station's power rapidly decreasing as detected at the base station below a SIR threshold, the base station will cause power control commands 18 to be issued to command the mobile station to increase its transmitted output power in small steps. In carrying out these commands, the channel fading 16 is ameliorated as shown by reference numeral 20 showing received power at the base station with power control. As in FIG. 1A, the fading effect is ameliorated but not as effectively or as rapidly as might be desired.

First Embodiment

Figure 2A:
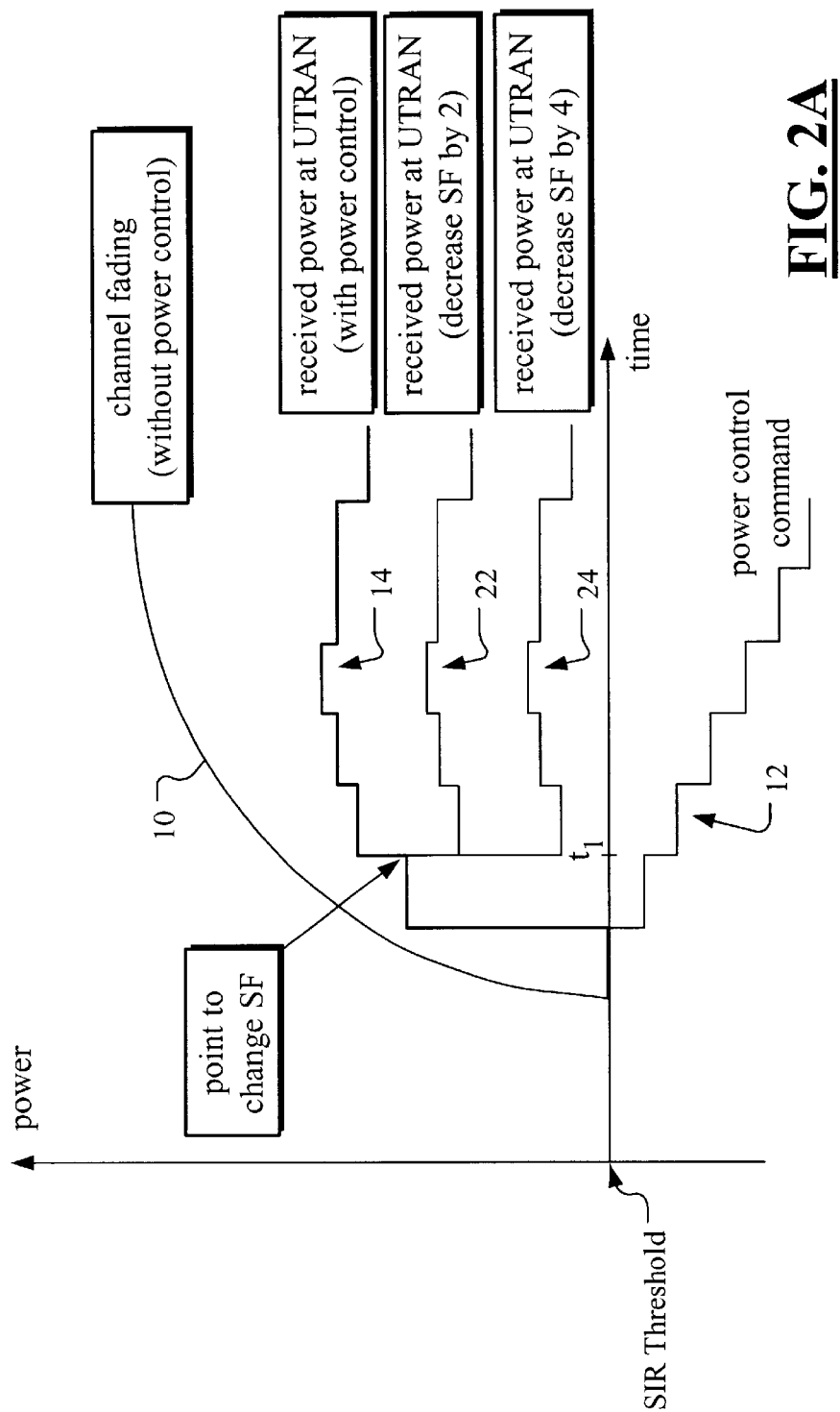
FIG. 2A shows an improvement to the solution shown in FIG. 1A, wherein, according to the present invention, in response to a rapidly-increasing channel fade determined either at the base station or at the mobile station, the spreading factor used for uplink channel spreading by the mobile station is changed to dramatically counteract the power fluctuation.

FIG. 2A is similar to FIG. 1A in that an increasing fading channel 10 is shown without power control and with power control 14 according to power control commands 12. However, unlike FIG. 1A, in addition to power control commands 12, another or a different control message is sent from the base station on the downlink to the mobile station to cause the mobile station to change its spreading factor in order to further reduce power and to do so more dramatically and more quickly. This can be done by signaling, for instance by way of the transmit format combination indicator (TFCI) signal which is sent in every time slot. For example, at a certain point in time $t_1$ the spreading factor can be decreased by two or, for another example, by four. The result of these two possible decreases of spreading factor are shown by reference numerals 22 and 24, respectively. As can be seen in FIG. 2A, the received power at the base station is quickly and dramatically reduced to near the SIR threshold, especially by using a decrease of four. This improves favorably to the level received as the base station according to reference numeral 14 in FIG. 1A where the received power still is very high even after numerous power control commands 12. This combination of power control commands 12 and decreases in spreading factor can work to quickly and powerfully reduce the deleterious affects of channel fading, according to the present invention. Or, the adaptive spreading factor approach can be used by itself.

Figure 2B:
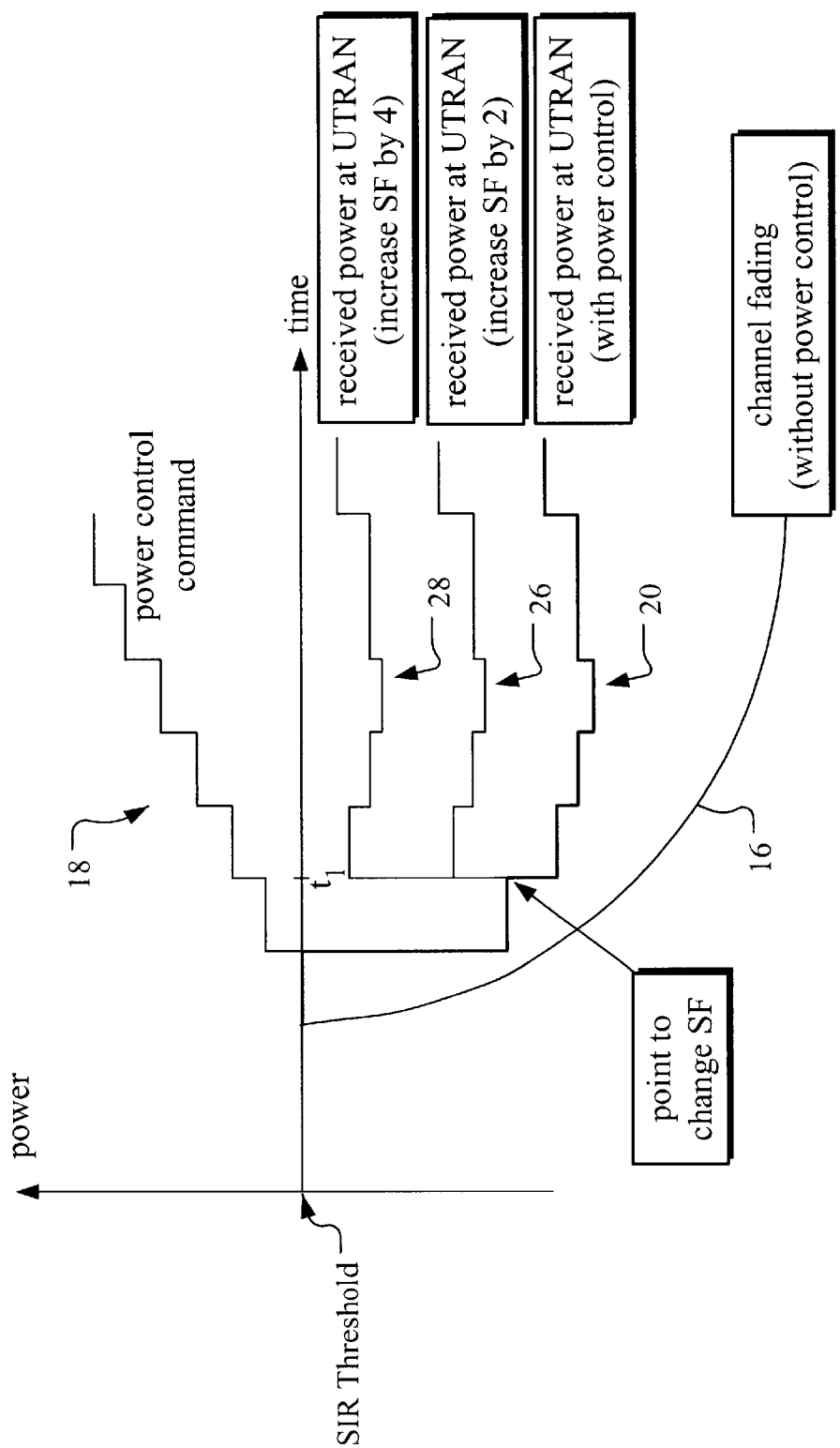
FIG. 2B improves over the prior art of FIG. 1B by causing the spreading factor used for uplink channel spreading to be dramatically increased in the presence of channel fading in a decreasing direction in order to counteract same.

Similarly, as shown in FIG. 2B for a rapidly decreasing channel fading condition, the base station not only sends power control commands 18 as in FIG. 1B but also causes a TFCI command at time $t_1$ to increase the spreading factor for example by two or by four. This causes for instance an increase in detected power from the mobile station at the base station indicated by reference numerals 26 and 28, respectively. Either of these increase in SF improves over the prior art signified by reference numeral 20.

In addition to or as an alternative to using a command signal from the network, e.g., from the base station or radio network controller to change its spreading factor, the mobile station may rely on other factors which it may evaluate together with or independently in order to make a decision or final decision as to whether to change the spreading factor. Such factors might include whether there would be enough codes available after a commanded decrease, whether there would be enough power available for a reasonable period after an increase in spreading factor. Such factors might also alternatively include the frame or block error rate. Using such statistics will make the algorithm more robust and less susceptible to erroneous decisions.

Second Embodiment

The second embodiment can be explained by FIGS. 2A and 2B as well, except that the change in spreading factor is decided and controlled at the mobile station. In this case, the mobile station receives the transmit power command (TPC) sent from the network, e.g., from the base station or UTRAN to the mobile station. If the mobile station receives several successive "up" transmit power commands sent by the base station, that may mean the signal currently transmitted by the mobile station is fading greatly. Consequently, the mobile station will decide that in fact fading is occurring and will increase the spreading factor at the next transmission interval such as shown occurring at time $t_1$ in FIG. 2B. Subsequently, if the mobile station then receives several "down" power commands from the base station, that may mean the channel condition has become "good" and the mobile station will decrease the spreading factor at the next transmission time interval (TTI).

Both the first and second embodiments described above constitute adaptive power control schemes according to the present invention.

It should be noted that the second embodiment is sensitive to TPC error. To cope with this problem a slide command window can be used. The slide command window is a window containing a selected number (W) of the last power commands. If in the slide command window there have been $B_1$ (with $B_1$ less than W) "up" power control commands received, the spreading factor is increased provided, that $B_1$ is greater than $B_2$ where $B_2$ is the number of received "down" power control commands. In the reverse situation, if the received number of "down" power control commands equals $B_2$ and the number of received "down" power control commands is greater than the received number of "up" power control commands $B_1$, the spreading factor is decreased. Otherwise, the current spreading factor is used to transmit the signal on the uplink. Adaptive window thresholds $B_1$ and $B_2$ can also be used as well as an adaptive size of the slide command window W. The adaptive thresholds and the adaptive size of the window can be freely chosen by the system designer who will have the flexibility to pick and choose depending on particular design choices/criteria.

Figure 3:
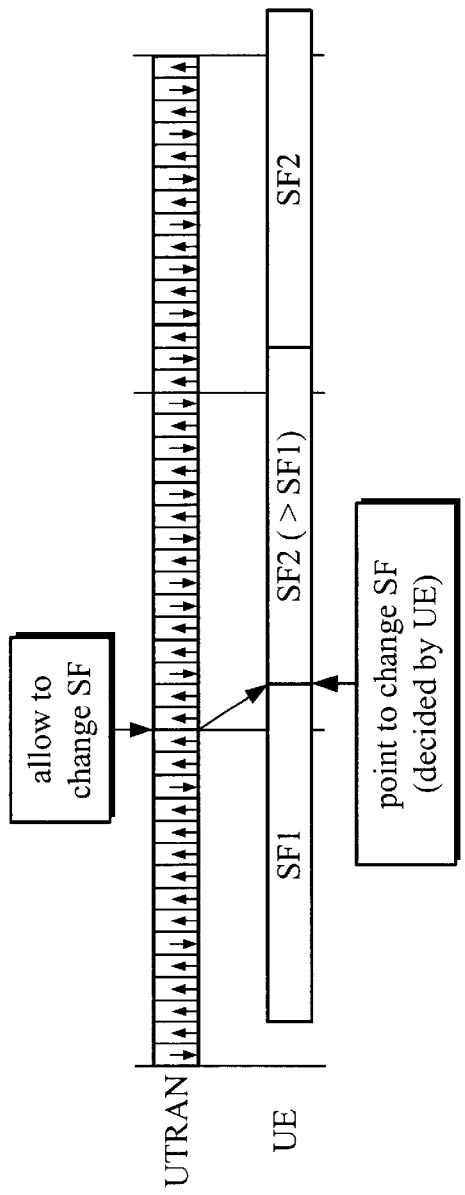
FIG. 3 shows a methodology according to a second embodiment of the present invention, wherein the mobile station determines that a power fade exists and takes steps to change the spreading factor on its own initiative by counting successive up or down transmit power commands received from the base station within a given time frame.

In this case where the decision is determined by the mobile station, after counting the number of up/down power control commands and deciding that a change in spreading factor is appropriate, the UTRAN or base station will be told by the mobile station that a change in spreading factor is desired. The UTRAN or base station may then decide whether to allow the mobile station to change its spreading factor or not at the next transmission time interval. Based on the information sent by the UTRAN or base station and the total received up/down power control command in a transmission time interval, the mobile station will then decide whether to change the spreading factor or not. This is shown in FIG. 3.

Third Embodiment

Figure 4:
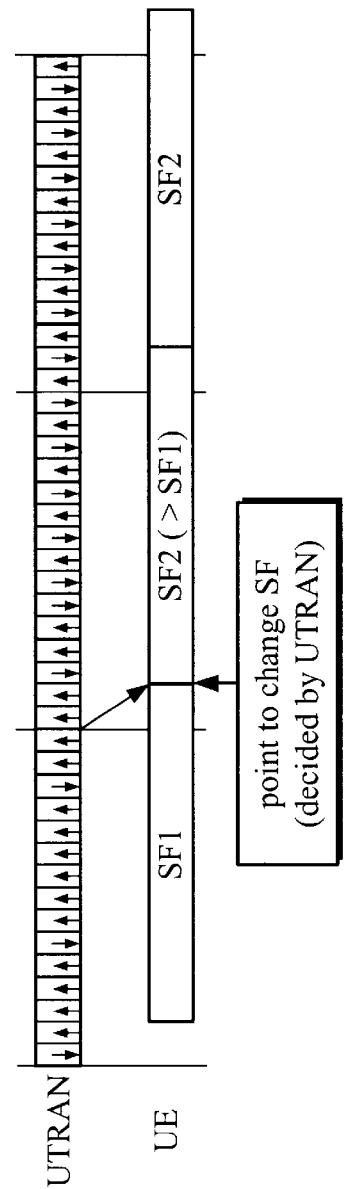
FIG. 4 illustrates a third embodiment of the invention which is similar to the second embodiment, except that the TPC is counted at the base station and the count is used to formulate a spreading factor command for use in the mobile station in controlling its spreading factor used for the uplink channel spreading to counteract the power fluctuation.

Instead of having the network or base station make the decision based per se on the same data it uses to decide whether to send an up or down TPC, as in the first embodiment, the present invention can be carried out by having the network, e.g., the base station instead use a decision-making criterion such as described above in connection with the second embodiment. In that case, the UTRAN or base station will e.g. count the number of up/down power control commands that the base station has sent to the mobile station. If the total number of up or down power control commands exceeds the threshold which may be fixed or adaptive, e.g., based on current system load, the network, e.g., the UTRAN or base station will send a command to ask the mobile station to change its spreading factor. This is shown in FIG. 4.

For either the second or third embodiments for UE or network-based decision making, the spreading factor adjustment can also be made as a function of the frame or block error rate, as suggested above. Monitoring and using such a statistic either separately or in conjunction with a windowed or series version of the TPC commands will make the algorithm more robust and less susceptible to erroneous decisions. For instance, if used in conjunction with a count of the TPC signal, the spreading factor could be changed only if the frame or block error rate meets or fails to meet a selected criterion. If used alone, the spreading factor could be changed if the frame or block error rate meets or fails to meet a selected criterion.

Uplink Closed-Loop Power Control

Figure 5:
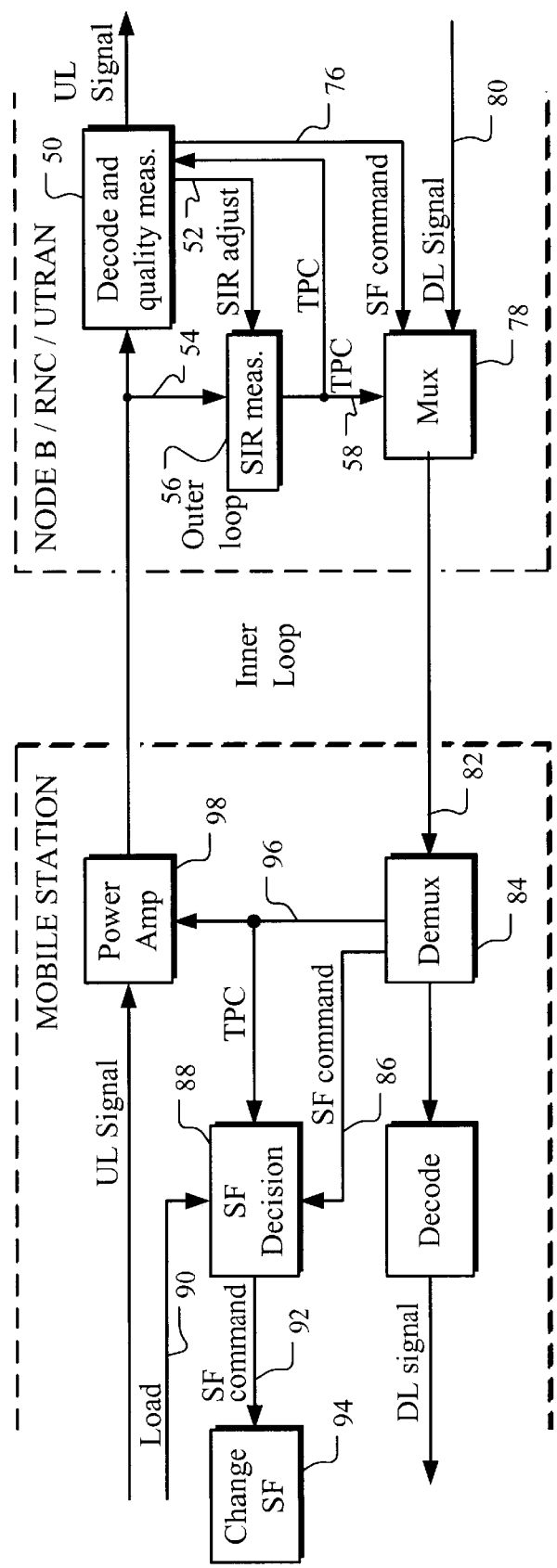
FIG. 5 shows an uplink closed-loop power control modified to include components useful for carrying out the first, second and third embodiments of the present invention.

FIG. 5 shows an uplink closed-loop power control modified, according to the present invention, to include the ability to change the mobile station's spreading factor to counteract power fluctuations. FIG. 5 shows several embodiments in one drawing, and therefore it should be understood that not all of the components shown in FIG. 5 are necessary to carry out individual embodiments of the present invention. In the base station, called Node B according to 3G UTRAN terminology, or in the radio network controller (RNC), or more generally elsewhere in the network, a quality measurement is made in a decoding and quality measurement means 50 to determine a radio uplink channel power condition. Such might include the above-mentioned frame or block error rate. Depending on the current quality measurement, e.g., the signal-to-interference ratio (SIR) target or threshold is adjusted, as indicated by a signal on a line 52. The incoming radio uplink channel on a line 54 is provided to an SIR measurement means 56 which compares the measured SIR on the line 54 to the current SIR threshold or target, as provided on the line 52, and provides a series of transmit power command (TPC) signals on a line 58, such as shown by the up and down arrows in FIGS. 3 and 4, one for each slot measurement.

Figure 6:
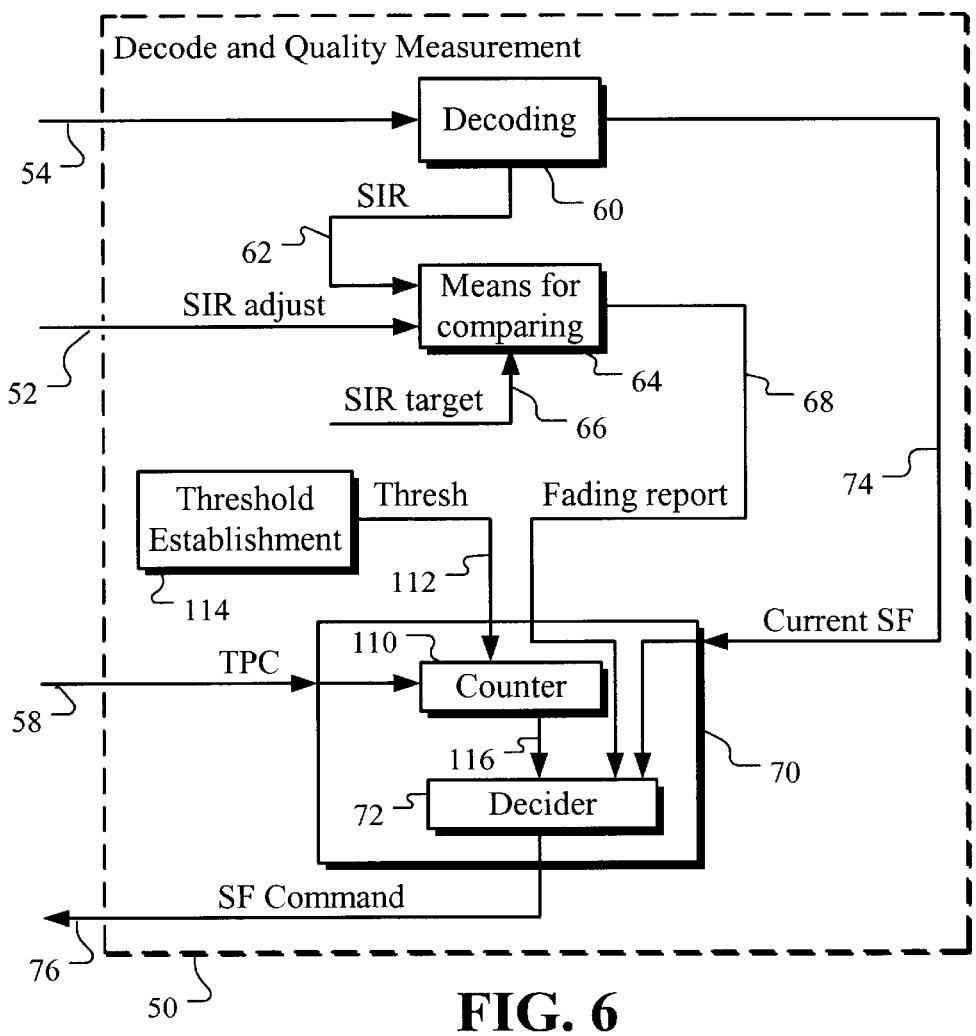
FIG. 6 shows the decode and quality measurement block in the radio network controller of FIG. 5.

According to the first embodiment of the present invention, the network, e.g., the Node B/RNC/UTRAN decides whether and when to change the spreading factor used by the mobile station in the uplink. This can be based on the quality measurement described above, which was formerly used only for creation of the TPC. FIG. 6 shows more detail of the decoding and quality measurement means 50 of FIG. 5. In a decoding block 60, the uplink channel signal on the line 54 is received and decoded. Its signal-to-interference ratio (SIR) (or the like) is provided on a line 62 to a means 64 for comparing the measured SIR on the line 62 to an SIR target signal on a line 66. This SIR target will vary according to reasons not pertinent to the present invention and which need not be described here. The block or frame error rate may also be determined in the block 60 and a signal indication thereof provided on the line 62 for comparison in the block 64 with a target signal on the line 66. According to the first mentioned comparison, the SIR adjustment signal on the line 52 is provided to the SIR measurement means 56 of FIG. 5. According to the first embodiment of the present invention, in addition to providing the SIR adjustment signal on the line 52, the means for comparing 64 may also provide a fading report signal on a line 68 to a spreading factor decision block 70. This decision block 70 can include various components, depending on the embodiment of the invention. According to the first embodiment of the invention as described above, the decision block 70 will include a decider 72 that is responsive to both the fading report signal on the line 68 and to a current spreading factor signal on a line 74, which is provided by the decoding means 60. The mobile station will normally indicate its spreading factor in the uplink, and this information may be decoded in the decoder 60. The decider 72 will make a decision about whether the current spreading factor used by the mobile station should be increased, decreased or left the same, depending on the magnitude of the fading report signal. A decreasing power fluctuation would lead the decider 72 to call for an increase in the spreading factor. The magnitude of the increase will depend on the magnitude of the fade. On the other hand, an increasing power fluctuation will cause the decider 72 to call for a decrease in spreading factor used by the mobile station. Depending on its decision, the decider 72 will provide a spreading factor command signal on a line 76 which, as shown in FIG. 5, will be provided to a multiplexer 78 which multiplexes the TPC on the line 58, the spreading factor command on the line 76, and the downlink signal on a line 80 to provide a downlink signal on a line 82 to the mobile station over a radio interface. Furthermore, if the above mentioned additional decoding takes place so as to determine frame or block error rate, a related comparison may take place in the means for comparing 64 so as to compare the frame or block error rate with a target on the line 66 and provide a frame or block error rate report on the line 68 to the spreading factor decision block 70. This information may be used by itself or in conjunction with the TPC decision making process to determine whether to issue a spreading factor command signal on the line 76.

Referring back to FIG. 5, a demultiplexer in the mobile station receives the spreading factor command on the line 76 as part of the multiplexed signal on the line 82 and provides it on a line 86 after demultiplexing. A spreading factor decision is then made in a decision block 88 based on the spreading factor command signal on the line 86 alone or alternatively on other factors as well, such as load, the number of channels, the amount of battery power available, and other mobile station specific factors as signified by a signal line 90. In other words, the spreading factor command signal sent by the upstream base station/Node B is not necessarily obeyed without considering other factors. Once this is done in the decision block 88, a spreading factor command signal is provided on a line 92 to a change block 94 wherein the spreading factor can be changed by the mobile station according to the command signal on the line 92. A decider 91 within the SF decision block 88 is responsive to both signals on the line 86, 90 for providing the signal on the line 90.

As previously mentioned, the various components shown in FIG. 5 are not necessarily all present in a given system. For instance, in the second embodiment, there would be no SF command signal 76 multiplexed onto the signal line 82, and the demultiplexer will only provide a demultiplexed TPC signal on a line 96 not only to a power amplifier 98 (in order to carry out the transmit power command of the prior art), but also to the spreading factor decision block 88. Similarly, although the network side of FIG. 5 is described in 3G terms, the invention is not restricted to 3G networks.

Figure 7:
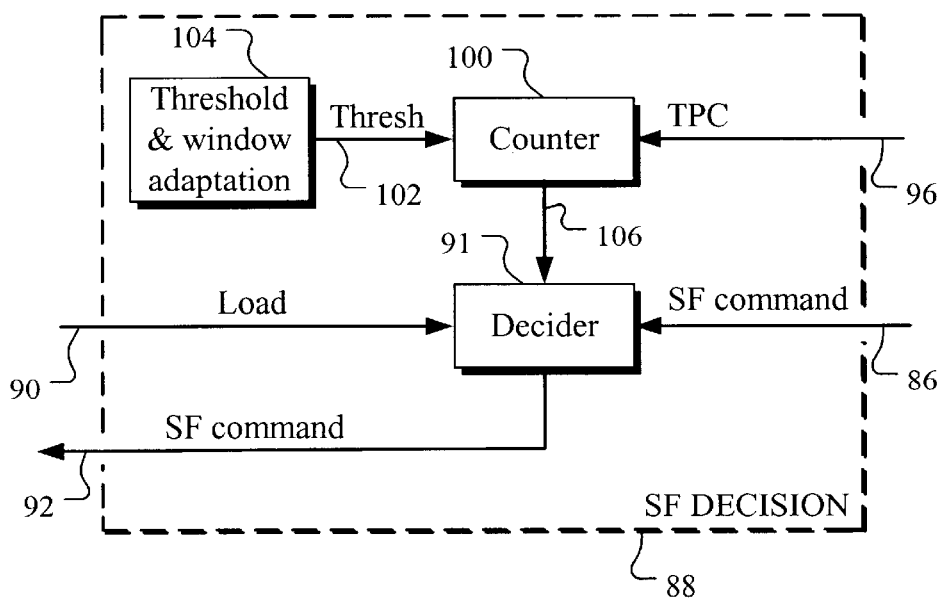
FIG. 7 shows the spreading factor decision block of the mobile station of FIG. 5 in more detail.

Referring now to FIG. 7, further details of the spreading factor decision block 88 are shown, with components selectable according to the second or third embodiments. A counter 100 is shown therein (second embodiment), responsive to the TPC signal on the line 96, as well as a threshold signal on a line 102 from a threshold and window adaptation block 104. The adaptation block 104 has the ability to adaptively change window thresholds as well as the size of the window, as mentioned previously in connection with the second embodiment. In any event, once a threshold is exceeded, a signal is provided on a line 106 to the decider 91, which may immediately issue the spreading factor command signal on the line 92 or alternatively may take into consideration other factors, such as shown by the signal on the line 90. The signal on line 90 may also be representative over the factors such as frame or block error rate of the radio uplink channel. Such might be determined in the node B of the mobile station or the node B for determining the frame or block error rate of the radio uplink channel. In either event, the SF command signal on the line 92 is provided to the spreading factor change block 94, which carries out the commanded change in spreading factor used for uplink channel spreading to counteract the power fluctuation.

Referring back to FIG. 6, components that may be used to carry out the third embodiment of the present invention will now be described also in connection with FIG. 7. In this embodiment, the Node B/RNC/UTRAN is the one that is deciding the spreading factor command signal on the line 76, but this time based on a TPC count. Therefore, a counter 110 is shown responsive to both the TPC signal on the line 58 and to a threshold signal on a line 112 from a threshold establishing means 114. In this case, the counter counts the TPC signal and compares them to the threshold on the line 112 before issuing a signal on a line 116 indicating the TPC has exceeded the threshold and by how much. The decider 72 in this embodiment is responsive to the signal on the line 16 rather than the fading report signal on the line 68 of the first embodiment. It is also responsive to the current SF signal on the line 74, as in the first embodiment. It then decides whether the spreading factor used by the mobile station should increase, decrease and by how much, or stay the same. This is a signal on the line 76 to the multiplexer 78 of FIG. 5. It eventually propagates to reach the decider 91 of FIG. 7 in the form of the SF command signal on the line 86.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method, comprising the steps of:
   determining that a radio uplink channel power fluctuation exists, said determining is carried out in a radio network,
   sending a spreading factor control signal from said network to a mobile station, and
   changing a spreading factor used for uplink channel spreading to counteract said power fluctuation,
   wherein said step of changing is carried out by said mobile station only if said mobile station independently determines that said step of changing the spreading factor is permissible.

2. A method, comprising the steps of:
   determining that a radio uplink channel power fluctuation exists, said determining is carried out in a radio network,
   sending a spreading factor control signal from said network to a mobile station,
   changing a spreading factor used for uplink channel spreading to counteract said power fluctuation, and
   sending a transmit power control (TPC) signal from said network to said mobile station,
   wherein said step of determining comprises the step of counting instances of said TPC signal at said network and carrying out said step of determining by determining at said network if a count of said instances exceeds a selected number.

3. The method of claim 2, wherein said selected number is adaptable.

4. The method of claim 2, wherein said selected number is adaptable within a window comprising a selected plurality of TPC signal instances.

5. The method of claim 4, wherein said selected plurality of TPC signal instances comprising said window is adaptable.

6. A method, comprising the steps of:
determining that a radio uplink channel power fluctuation exists by detecting in a radio network said radio uplink channel power fluctuation in said radio uplink channel from a mobile station to said network,
changing a spreading factor used for uplink channel spreading to counteract said power fluctuation, and
transmitting a transmit power control (TPC) signal from said network to said mobile station commanding a change in transmit power to counteract said power fluctuation,
wherein said step of determining comprises the step of counting instances of said TPC signal at said network or at said mobile station and carrying out said step of determining by determining at said network or at said mobile station if a count of said instances exceeds a selected number followed by said mobile station carrying out said step of changing said transmit power in response to a command signal from said network or in response to said count at said mobile station exceeding said selected number.

7. The method of claim 6, wherein said selected number is adaptable.

8. The method of claim 6, wherein said selected number is adaptable within a window comprising a selected plurality of TPC signal instances.

9. The method of claim 8, wherein said selected plurality of TPC signal instances comprising said window is adaptable.

10. The method of claim 6, wherein said step of determining further comprises the step of determining a frame or block error rate of said radio uplink channel and wherein said step of changing the spreading factor is carried out only if said frame or block error rate meets a selected criterion.

11. The method of claim 6, wherein said step of changing is carried out by said mobile station only if said mobile station independently determines that said step of changing the spreading factor is permissible.

12. A method, comprising the steps of:
determining that a radio uplink channel power fluctuation exists by detecting in a radio network said radio uplink channel power fluctuation in said radio uplink channel from a mobile station to said network,
changing a spreading factor used for uplink channel spreading to counteract said power fluctuation,
transmitting a transmit power control (TPC) signal from said network to said mobile station commanding a change in transmit power to counteract said power fluctuation, and
counting, at the mobile station, instances of said TPC signal and
wherein said step of determining comprises the step of determining at said mobile station if a count of said instances exceeds a selected number.

13. The method of claim 12, wherein said selected number is adaptable.

14. The method of claim 12, wherein said selected number is adaptable within a window comprising a selected plurality of TPC signal instances.

15. The method of claim 14, wherein said selected plurality of TPC signal instances comprising said window is adaptable.

16. The method of claim 12, wherein said step of determining further comprises the step of determining a frame or block error rate of said radio uplink channel and wherein said step of changing the spreading factor is carried out only if said frame or block error rate meets a selected criterion.

17. A method, comprising the steps of:
determining that a radio uplink channel power fluctuation exists, and
changing a spreading factor used for uplink channel spreading to counteract said power fluctuation,
wherein said step of determining is carried out in a mobile station.

18. The method of claim 17, further comprising the step of counting, at the mobile station, instances of a transmit power control (TPC) signal received from a radio network and wherein said step of determining comprises the step of determining at said mobile station if a count of said instances exceeds a selected number.

19. The method of claim 18, wherein said selected number is adaptable.

20. The method of claim 18, wherein said selected number is adaptable within a window comprising a selected plurality of TPC signal instances.

21. The method of claim 20, wherein said selected plurality of TPC signal instances comprising said window is adaptable.

22. The method of claim 18, wherein said step of determining further comprises the step of determining a frame or block error rate of said radio uplink channel and wherein said step of changing the spreading factor is carried out only if said frame or block error rate meets a selected criterion.

23. Apparatus, comprising:
means for determining that a radio uplink channel power fluctuation exists, said means for determining is located in a radio network;
means for changing a spreading factor used for uplink channel spreading to counteract said power fluctuation; and
means for sending a spreading factor control signal from said network to a mobile station to means for deciding a change in spreading factor, wherein said change is carried out by said mobile station only if said means for deciding independently determines that said change in the spreading factor is permissible.

24. Apparatus, comprising:
means for determining that a radio uplink channel power fluctuation exists, said means for determining is located in a radio network;
means for changing a spreading factor used for uplink channel spreading to counteract said power fluctuation;
means for sending a spreading factor control signal from said network to a mobile station to means for deciding a change in spreading factor; and
means for sending a transmit power control (TPC) signal from said network to said mobile station and wherein said means for determining comprises means for counting instances of said TPC signal at said network and means for deciding at said network if a count of said instances exceeds a selected number.

25. The apparatus of claim 24, wherein said selected number is adaptable.

26. The apparatus of claim 24, wherein said selected number is adaptable within a window comprising a selected plurality of TPC signal instances.

27. The apparatus of claim 26, wherein said selected plurality of TPC signal instances comprising said window is adaptable.

28. An apparatus, comprising:

means for determining that a radio uplink channel power fluctuation exists, said means for determining comprises means for detecting in a radio network said radio uplink channel power fluctuation in said radio uplink channel from a mobile station to said network, means for changing a spreading factor used for uplink channel spreading to counteract said power fluctuation, and means for transmitting a transmit power control (TPC) signal from said network to said mobile station commanding a change in transmit power to counteract said power fluctuation, wherein said means for determining comprises means for counting instances of said TPC signal at said network or at said mobile station and means for determining at said network or at said mobile station if a count of said instances exceeds a selected number followed by said mobile station changing said transmit power in response to a command signal from said network or in response to said count at said mobile station exceeding said selected number.

29. The apparatus of claim 28, wherein said selected number is adaptable.

30. The apparatus of claim 28, wherein said selected number is adaptable within a window comprising a selected plurality of TPC signal instances.

31. The apparatus of claim 30, wherein said selected plurality of TPC signal instances comprising said window is adaptable.

32. The apparatus of claim 28, wherein said means for determining further comprises means for determining a frame or block error rate of said radio uplink channel and wherein said means for changing the spreading factor changes the spreading factor only if said frame or block error rate meets a selected criterion.

33. The apparatus of claim 28, wherein said means for changing is carried out by said mobile station only if said mobile station independently determines that said changing the spreading factor is permissible.

34. An apparatus, comprising:

means for determining that a radio uplink channel power fluctuation exists, said means for determining comprises means for detecting in a radio network said radio uplink channel power fluctuation in said radio uplink channel from a mobile station to said network, means for changing a spreading factor used for uplink channel spreading to counteract said power fluctuation, means for transmitting a transmit power control (TPC) signal from said network to said mobile station commanding a change in transmit power to counteract said power fluctuation, and means for counting, at the mobile station, instances of said TPC signal and wherein said means for determining comprises means for determining at said mobile station if a count of said instances exceeds a selected number.

35. The apparatus of claim 34, wherein said selected number is adaptable.

36. The apparatus of claim 34, wherein said selected number is adaptable within a window comprising a selected plurality of TPC signal instances.

37. The apparatus of claim 36, wherein said selected plurality of TPC signal instances comprising said window is adaptable.

38. The apparatus of claim 34, wherein said means for determining further comprises means for determining a frame or block error rate of said radio uplink channel and wherein said means for changing the spreading factor changes the spreading factor only if said frame or block error rate meets a selected criterion.

39. An apparatus, comprising:

means for determining that a radio uplink channel power fluctuation exists, and means for changing a spreading factor used for uplink channel spreading to counteract said power fluctuation, wherein said means for determining is located in a mobile station.

40. The apparatus of claim 39, further comprising means for counting, at the mobile station, instances of a transmit power control (TPC) signal received from a radio network and wherein said means for determining comprises means for determining at said mobile station if a count of said instances exceeds a selected number.

41. The apparatus of claim 40, wherein said selected number is adaptable.

42. The apparatus of claim 40, wherein said selected number is adaptable within a window comprising a selected plurality of TPC signal instances.

43. The apparatus of claim 42, wherein said selected plurality of TPC signal instances comprising said window is adaptable.

44. The apparatus of claim 40, wherein said means for determining further comprises the means for determining a frame or block error rate of said radio uplink channel and wherein said means for changing the spreading factor changes the spreading factor only if said frame or block error rate meets a selected criterion.

\* \* \* \* \*